(12) United States Patent
Sugimoto

(10) Patent No.: US 7,142,384 B2
(45) Date of Patent: Nov. 28, 2006

(54) MAGNETIC RECORDING MEDIUM HAVING MAGNETIC DECOUPLING ABILITY

(75) Inventor: Toshio Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/744,192

(22) Filed: Dec. 22, 2003

(65) Prior Publication Data

US 2004/0136107 A1    Jul. 15, 2004

Related U.S. Application Data

(63) Continuation of application No. PCT/JP01/05579, filed on Jun. 28, 2001.

(51) Int. Cl.
G11B 5/02 (2006.01)
G11B 21/02 (2006.01)
(52) U.S. Cl. ............... 360/59; 369/13.42; 360/75
(58) Field of Classification Search ............. 360/55, 360/59, 131, 135; 428/694 ML, 694 MM, 428/694 TM, 694 DM, 694 IS, 694 BN; 369/14, 15, 13.01, 13.02, 13.35, 13.38, 13.39, 369/13.46, 13.51, 13.56
See application file for complete search history.

(56) References Cited

U.S. PATENT DOCUMENTS 5,319,507 A * 6/1994 Umebayashi et al. ..... 360/77.03

6,483,653 B1 * 11/2002 Katayama et al. ............ 360/59

FOREIGN PATENT DOCUMENTS

| JP | 60-127545 | 7/1985 |
|---|---|---|
| JP | 2-230532 | 9/1990 |
| JP | 5-307783 | 11/1993 |
| JP | 6-274960 | 9/1994 |
| JP | 8-273231 | 10/1996 |
| JP | 2001-195702 | 7/2001 |
| JP | 2001-216620 | 8/2001 |

* cited by examiner

Primary Examiner—Andrea Wellington
Assistant Examiner—Varsha A. Kapadia
(74) Attorney, Agent, or Firm—Greer, Burns & Crain, Ltd.

(57) ABSTRACT

A magnetic recording medium includes a positioning magnetic layer having magnetism and is used for positioning the optical head. The magnetic recording medium recording method includes a first step of moving the magnetic head to a predetermined position on the magnetic recording medium, a second step of supplying a positioning magnetic field Hr from the magnetic head to the positioning magnetic layer for positioning the optical head, and a third step of outputting positioning light Pr from the optical head for positioning the optical head, producing a magnetic optical effect with respect to the positioning magnetic layer magnetized by the positioning magnetic field Hr, and controlling the optical head so as to face a position of the magnetic head based on a detection result of the magnetic optical effect.

8 Claims, 5 Drawing Sheets

MAGNETIC RECORDING MEDIUM HAVING MAGNETIC DECOUPLING ABILITY

This is a continuation of International PCT Application No. PCT/JP01/05579 filed Jun. 28, 2001.

TECHNICAL FIELD

The present invention generally relates to a magnetic recording method and a magnetic recording device for recording magnetic information on a magnetic recording medium by employing a thermal assist technique, and particularly, to a magnetic recording method and a magnetic recording device able to precisely position an optical head for thermal assisting when recording magnetic information on the magnetic recording medium using the magnetic head, and thereby enabling high density recording, and the magnetic recording medium suitable for the magnetic recording device.

BACKGROUND ART

Along with rapid spreading of multimedia technology in recent years And continuing, memories, for example, magnetic recording media, which play important roles in the multimedia technology, are required to have larger and larger capacity.

In recent years and continuing, remarkable progress has been made to increase the recording density of the magnetic recording media, and the recording density is being increased as fast as by 200% per year. For higher recording density, however, a problem has to be solved regarding the thermal fluctuation in a magnetic film in which magnetic information is recorded. One of the solutions is to form a magnetic recording medium consisting of a recording layer formed from a magnetic material having a high coercivity, and study has been made actively in this field.

As one of the technologies of recording magnetic information in the recording layer formed from the magnetic material having a high coercivity, the so-called thermal assist recording technology has been proposed. In the thermal assist recording, the coercivity Hc of the recording layer (a magnetic material) changes with temperature, and decreases when temperature approaches the Curie temperature Tc. The thermal assist recording technology involves an application of the so-called "Curie temperature recording technology" commonly used in a magneto optical recording device; in the thermal assist recording, a laser is emitted to the recording medium to increase the temperature thereof, and recording is performed by an external magnetic field (recording magnetic field from a magnetic head) with a lowered coercivity.

In this technology, because recording is performed with the coercivity Hc of the recording layer being lowered, it is possible to decrease the recording magnetic field of the magnetic head. Meanwhile, because the coercivity Hc of the recording layer is high at room temperature, it is possible to stably record magnetic information without thermal fluctuation.

When applying the thermal assist recording technology to a magnetic recording device, in addition to the conventional magnetic head for recording and reproduction, it is necessary to add an optical head for emitting a laser. Furthermore, in order that the place to be recorded by the magnetic head is heated by the laser, the technique should be established to precisely locate the optical head relative to the position of the magnetic head during recording.

In the related art, recording with both a magnetic head and an optical head is used in magneto optical recording devices. The positioning method thereof is explained below. In the magneto optical recording device, which performs recording with both a magnetic head and an optical head, first, address signal (pit) formed in grooves on a substrate are read out as optical information, and a positioning mechanism determines the position of the optical head. The magnetic head is mechanically fixed relative to the optical head, and is thereby positioned in compliance with the positioning of the optical head.

When recording on a magneto optical medium, the magnetic field from the magnetic head is applied to a broad region covering the light spot formed on the medium by the optical head. The reason for applying the magnetic field to a broad region is that relative positions of the magnetic head and the optical head cannot be precisely controlled, so the region where the magnetic field is applied is set large so as to be certain to cover the light spot.

That is, with the positioning mechanism used in the magneto optical recording device, the magnetic head is positioned in compliance with the positioning of the optical head, and the magnetic field is applied to a broad region to compensate for the lower positioning precision of the magnetic head relative to the optical head.

In a magnetic recording device, however, the magnetic head can be precisely positioned on the magnetic recording medium by using the servo technique, and it becomes necessary to precisely position the optical head relative to the magnetic head.

Because the surface of the magnetic recording medium is flat without grooves, it is impossible to determine positions using grooves as is done in the case of the magneto optical recording medium. This makes it necessary to study new techniques to precisely position the optical head relative to the magnetic head.

Considering the possibility of mechanically fixing the optical head relative to the magnetic head, converse to the aforesaid magneto optical recording device, this leads to the same result that the positioning precision is bad. If the optical head cannot be positioned precisely relative to the magnetic head, the effect of the thermal assisting by using a laser cannot be produced, and high sensitivity recording in the recording layer, and therefore high density recording, cannot be achieved.

DISCLOSURE OF THE INVENTION

Accordingly, an object of the present invention is, concerning methods of recording magnetic information on a magnetic recording medium by employing a thermal assist technique, to provide a recording method capable of precisely positioning an optical head relative to a magnetic head, another object of the present invention is to provide a magnetic recording device realizing the method, and still another object of the present invention is to provide a magnetic recording medium usable by the device.

According to an aspect of the present invention, there is provided a magnetic recording medium recording method for recording magnetic information in a recording layer of a magnetic recording medium by using a magnetic head while heating the recording layer by light from an optical head, wherein the magnetic recording medium includes a positioning magnetic layer having magnetism and is used for positioning the optical head, said magnetic recording medium recording method comprising a first step of moving the magnetic head to a predetermined position on the magnetic recording medium, a second step of supplying a positioning magnetic field Hr from the magnetic head to the positioning magnetic layer for positioning the optical head, and a third step of outputting positioning light Pr from the optical head for positioning the optical head, producing a magnetic optical effect with respect to the positioning magnetic layer magnetized by the positioning magnetic field Hr, and controlling the optical head so as to face a position of the magnetic head based on a detection result of the magnetic optical effect.

According to the present invention, by detecting the position of the optical head that makes the detection result of the magnetic optical effect a maximum, the optical head can be set to an optimum position facing the magnetic head. Under this condition, the thermal assist effect works strongly, and the magnetic head can record magnetic information on the magnetic recording medium at high recording density.

In addition, the third step may be performed after the optical head is moved near the position facing the magnetic head in a coarse position adjustment. In this case, as a fine adjustment is performed after the coarse position adjustment, it is possible to more rapidly set the optical head to an optimum position facing the magnetic head.

The present invention further comprises a fourth step, after the third step, of applying a recording magnetic field Hw for recording the magnetic information in the recording layer from the magnetic head, emitting recording assisting light Pw for heating the recording layer from the optical head, and recording the magnetic information in the recording layer. Preferably, the positioning magnetic field Hr and the positioning light Pr have lower energies than the recording magnetic field Hw and the recording assisting light Pw, respectively.

That is, it is preferable that power of the positioning magnetic field Hr and the positioning light Pr for positioning the optical head be less that than that of the recording magnetic field Hw and the recording assisting light Pw, respectively, which are used in recording using the thermal assist technique. In this way, it is possible to prevent loss of the recorded magnetic information and reduce power consumption of the device.

The frequency of the alternating current for generating the positioning magnetic field Hr may be set to be different from that of the alternating current for generating the recording magnetic field Hw for recording the magnetic information in the recording layer and that of the alternating current used for reproducing the magnetic information.

By setting the frequencies of the alternating currents for recording and reproduction to be different from the frequency of the alternating current for generating the positioning magnetic field Hr, it is possible to generate the recording magnetic field Hw and the positioning magnetic field Hr with the same one magnetic head.

According to another aspect of the present invention, there is provided a magnetic recording device including a magnetic recording medium, a magnetic head that records magnetic information in a recording layer of the magnetic recording medium, a magnetic head driving means that moves the magnetic head to a predetermined position on the magnetic recording medium, an optical head that is arranged at a position facing the magnetic head with the magnetic recording medium in between and emits light to the recording layer to heat the recording layer during recording the magnetic information, and an optical head driving means that moves the optical head to the position facing the magnetic head, wherein the magnetic recording medium includes a positioning magnetic layer having magnetism that is used for positioning the optical head to the position facing the magnetic head, said magnetic recording device further comprising an optical head position control mechanism configured to control the position of the optical head so that the position of the optical head is opposite to the position of the magnetic head by utilizing magnetic optical effect occurring in accordance with a magnetic state of the positioning magnetic layer.

In the present invention, the magnetic recording medium having a positioning magnetic layer is used, and the optical head position control mechanism sets the optical head to an optimum position facing the magnetic head while detecting the position of the optical head that makes the detection result of the magnetic optical effect a maximum. Under this condition, the thermal assist effect works strongly, therefore it is possible to provide a magnetic recording device enabling the magnetic head to record magnetic information on the magnetic recording medium at high recording density.

The optical head position control mechanism may have a positioning magnetic field generating means configured to supply a positioning magnetic field Hr for positioning the optical head from the magnetic head to the positioning magnetic layer, a positioning light generating means configured to output positioning light Pr from the optical head for positioning the optical head, an optical head positioning means configured to control the optical head driving means based on a detection result of the magnetic optical effect occurring with respect to the positioning magnetic layer magnetized by the positioning light Pr and the positioning magnetic field Hr so that the optical head faces the position of the magnetic head.

The positioning magnetic field generating means may also act as a recording magnetic field generating means for recording the magnetic information in the recording layer, and generates the positioning magnetic field Hr and the recording magnetic field Hw with alternating currents having different frequencies.

Generally, a recording magnetic field generating means includes a magnetic head, therefore, by using the magnetic head also for generating the positioning magnetic field, it is possible to utilize the existing device.

The positioning light generating means may also act as a recording assisting light generating means for heating the recording layer, and generate the positioning light Pr having a lower energy level than a recording assisting light Pw.

Because it is necessary to provide an optical head as the recording assisting light generating means in the magnetic recording device using the thermal assist technique, if this optical head is also used for generating the positioning light, it is possible to simplify the configuration of the device.

According to another aspect of the present invention, there is provided a magnetic recording medium comprising a recording layer having magnetism; a positioning magnetic layer having magnetism and being used for positioning an optical head; and an intermediate layer between the recording layer and the positioning magnetic layer for generating a state in which magnetic coupling between the recording layer and the positioning magnetic layer does not occur when positioning the optical head.

Since the magnetic recording medium has the positioning magnetic layer, it is possible to set the optical head to an optimum position facing the magnetic head. Further, because an intermediate layer is provided, it is possible to prevent problems expected to occur when the positioning magnetic layer is provided.

It is preferable that the Curie temperature Tc1 of the positioning magnetic layer and the Curie temperature Tc2 of the recording layer satisfy $Tc1<Tc2$.

Preferably, the coercivity Hc1 of the positioning magnetic layer and the coercivity Hc2 of the recording layer are set to satisfy $Hc1<Hc2$, and the coercivity Hc1 substantially disappear at a temperature equal to or higher than a temperature near the Curie temperature Tc2 of the recording layer.

The intermediate layer may be a non-magnetic layer for decoupling magnetic exchange coupling between the recording layer and the positioning magnetic layer.

The intermediate layer may have a coercivity Hc3 less than a coercivity Hc1 of the positioning magnetic layer, and the coercivity Hc3 is set so that magnetization of the positioning magnetic layer substantially disappears at a temperature equal to or higher than a temperature near a Curie temperature Tc1 of the positioning magnetic layer.

The coercivity Hc1 of the positioning magnetic layer and the coercivity Hc2 of the recording layer are set to satisfy the relation:

$$Hc1<Hr<Hc2,$$

where, Hr is the positioning magnetic field supplied when positioning the optical head.

The positioning magnetic layer has a magnetic anisotropy at least in a direction perpendicular to a surface thereof when positioning the optical head.

BEST MODE FOR CARRYING OUT THE INVENTION

First Embodiment

Below, preferred a first embodiment of the present invention is explained with reference to the accompanying drawings.

An explanation is made of a magnetic recording medium 10 used in a magnetic recording device according to a first embodiment of the present invention.

Figure 1:
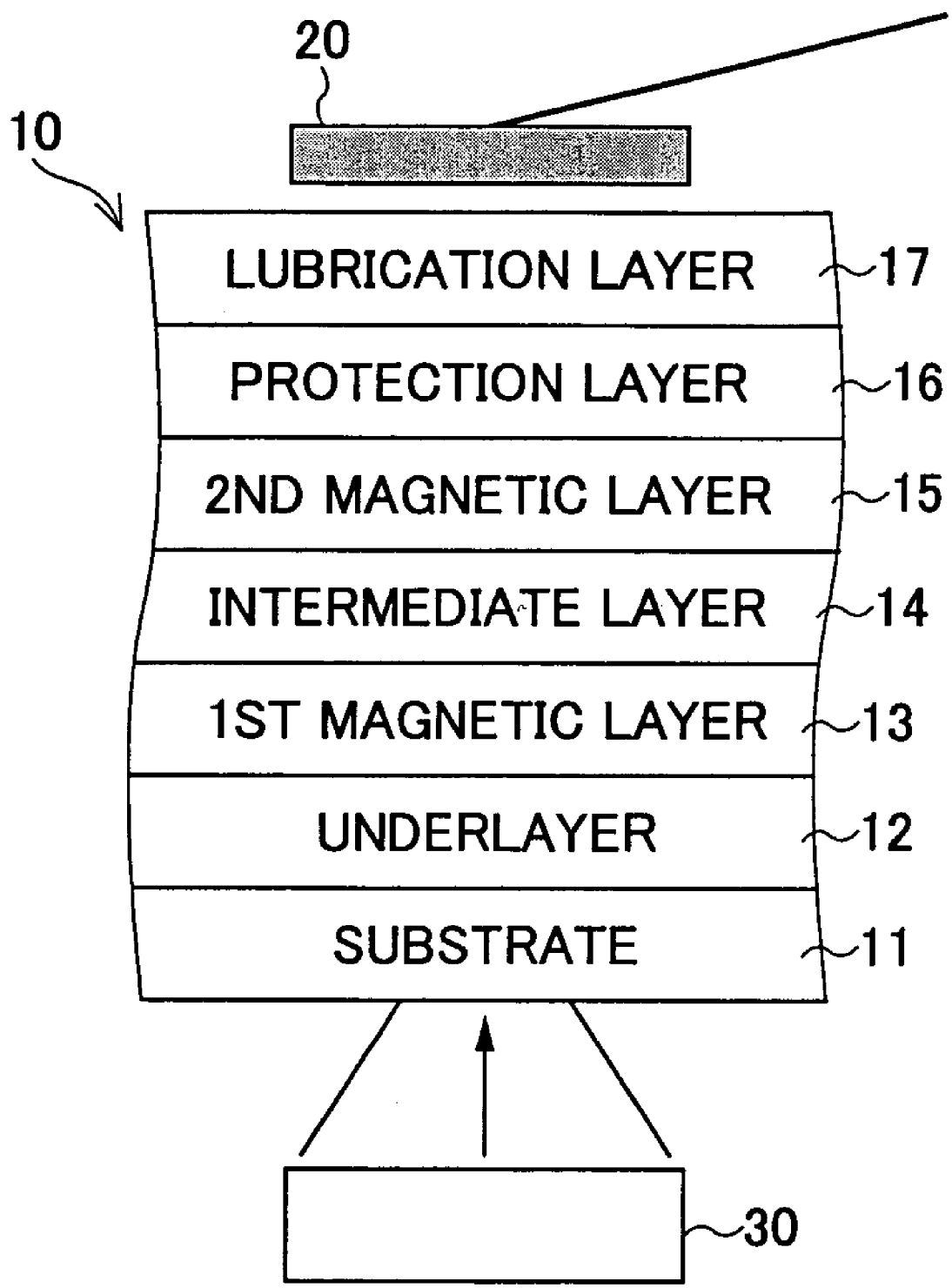
FIG. 1 is an enlarged view of a schematic configuration of a magnetic recording medium of a first embodiment of the present invention and devices around the magnetic recording medium.

FIG. 1 is an enlarged view of the schematic configuration of the magnetic recording medium 10 of the first embodiment of the present invention and devices around the magnetic recording medium 10.

Shown in FIG. 1 are the magnetic recording medium 10, a magnetic head 20 provided above the magnetic recording medium 10, and an optical head 30 provided below the magnetic recording medium 10.

First, the conditions the magnetic recording medium 10 has to satisfy are described prior to explanation of the structure of the magnetic recording medium 10.

As shown in FIG. 1, the magnetic recording medium 10 of the present embodiment includes two magnetic layers 13 and 15, and the two magnetic layers 13 and 15 are formed with the intermediate layer 14 in between. The magnetic layer 15, which is on the upper side, is a layer for recording magnetic information therein, and the magnetic information recorded in the magnetic layer 15 are reproduced. The magnetic layer 13, which is on the lower side, is a positioning magnetic layer formed for precisely positioning the optical head 30 to face the magnetic head 20.

As a recording layer, the magnetic layer 15 should be formed to have a sufficiently high coercivity Hc2, and the magnetic layer 13, which is a positioning magnetic layer, should have a coercivity Hc1 sufficient for positioning the optical head 30, specifically, the coercivity Hc1 of the magnetic layer 13 is lower than the coercivity Hc2 of the recording layer.

The relation between the coercivity Hc1 and the coercivity Hc2 is described in detail below.

Below, the magnetic layer 13 is referred to as "optical head positioning layer", and the magnetic layer is referred to as "recording layer".

The optical head positioning layer 13 is used for positioning the optical head 30. The magnetic head 20 applies a magnetic field Hr (referred to as "positioning magnetic field Hr") for positioning the optical head 30 to the optical head positioning layer 13, and magnetizes the optical head positioning layer 13 into a certain magnetizing state. Then, the optical head 30 emits light Pr (below, referred to as "positioning light") to the optical head positioning layer 13 for positioning the optical head 30, therefore, producing a magnetic optical effect (known as the "Kerr Effect"). Based on detection results (detection signals) of the Kerr Effect, the optical head 30 is positioned at high precision.

When recording magnetic information in the recording layer 15 using the magnetic head 20, however, it is preferable to reduce magnetization of the optical head positioning layer 13, which does not contribute to recording of magnetic information on the magnetic recording medium 10.

Therefore, in the present embodiment, the optical head positioning layer 13 and the recording layer 15 are set to satisfy a specified relation as explained below.

Figure 2:
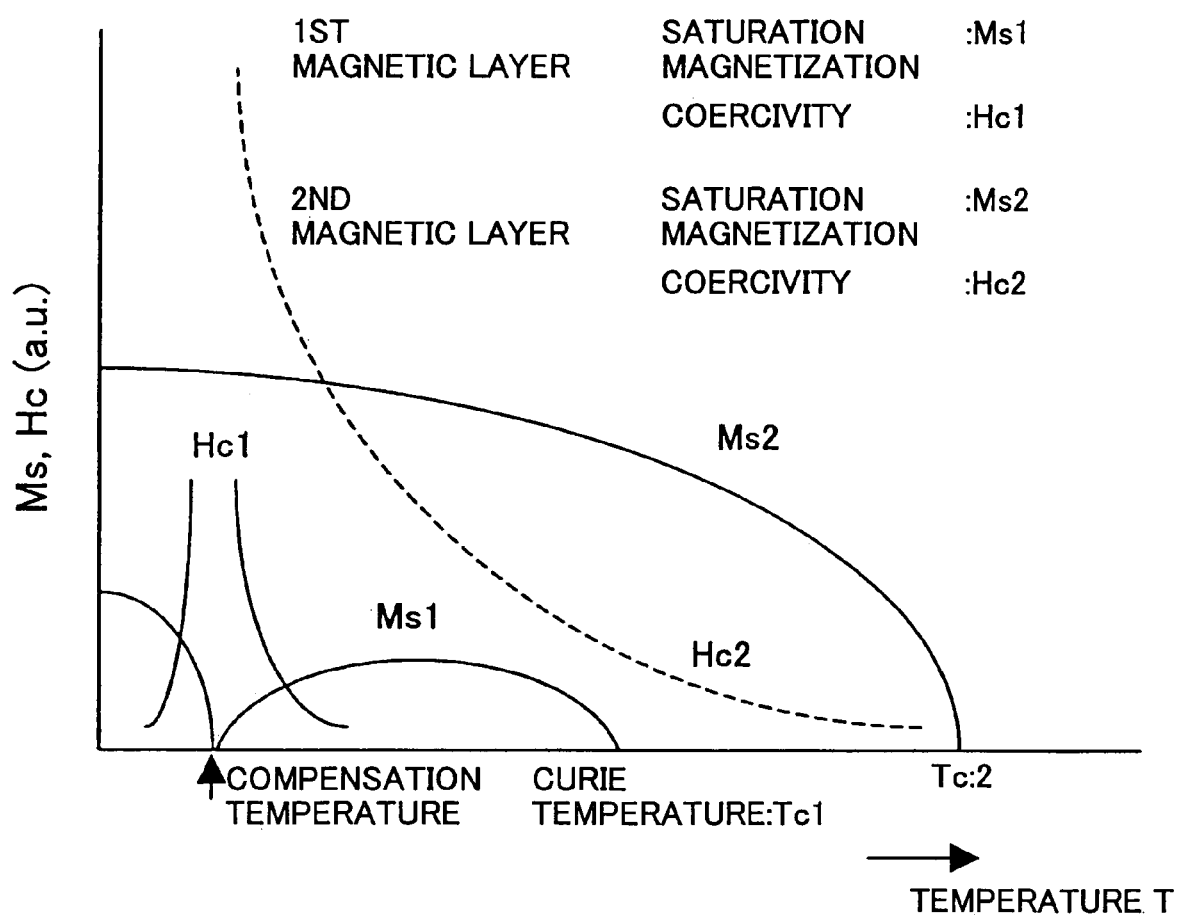
FIG. 2 is a graph showing relations between temperature T and the coercivity Hc of the first magnetic layer (optical head positioning layer) and the second magnetic layer (recording layer)

FIG. 2 is a graph showing relations between temperature T and the coercivity Hc of the first magnetic layer 13 (optical head positioning layer) and the second magnetic layer 15 (recording layer). In FIG. 2, the abscissa is temperature T, and Tc1 and Tc2 indicate the Curie temperature of the first magnetic layer 13 and the Curie temperature of the second magnetic layer 15, respectively. Ms1 and Ms2 indicate the saturation magnetization of the first magnetic layer 13 and the second magnetic layer 15, respectively.

The magnetic recording device of the present embodiment enables high density magnetic information recording by using the aforementioned thermal assist technique. For this purpose, first, the recording layer 15 should be formed by a magnetic material having a high coercivity Hc2 to obtain a high thermal fluctuation resistance. Then, during recording, the optical head emits recording assisting light Pw to heat the recording layer 15 so as to reduce the coercivity Hc2 of the recording layer 15, and this enables the magnetic head 20 to record magnetic information smoothly.

During recording, it is preferable that the coercivity Hc1 of the optical head positioning layer 13 be near zero. For this purpose, in the magnetic recording medium 10, the Curie temperature Tc1 of the optical head positioning layer 13 is set lower than the Curie temperature Tc2 of the second magnetic layer 15. As a result, during recording, when the optical head emits the recording assisting light Pw to heat the recording layer 15 so as to reduce the coercivity Hc2 of the recording layer 15, the temperature of the recording layer 15 increases to the Curie temperature Tc2 or so, and the magnetization of the optical head positioning layer 13 substantially disappears or becomes very small.

Therefore, in the magnetic recording medium 10 of the present embodiment, during recording, the leakage magnetic field from the optical head positioning layer 13 is suppressed, and the influence on the recording magnetic field Hw supplied for recording the magnetic information in the recording layer 15 is reliably preventable.

When the optical head 30 emits the recording assisting light Pw during recording, the Curie temperature Tc2 of the recording layer 15 is set so that the recording magnetic field Hw from the magnetic head 20 is reduced to a value equal to or less than the coercivity Hc2 of the recording layer 15.

In other words, preferably, the coercivity Hc2 of the recording layer 15 is set to be less than the recording magnetic field Hw from the magnetic head 20, when the recording assisting light Pw is emitted.

Even though the Curie temperature Tc2 of the recording layer 15 is set a little bit higher, recording in the recording layer 15 is still possible. But, if the Curie temperature Tc2 of the recording layer 15 is too high, the optical head 30 is required to provide higher light energy, which is not preferable because of disadvantages in power consumption and service life of the optical head 30.

Returning to FIG. 1 to continue explaining each layer in the magnetic recording medium 10, the magnetic recording medium 10 may be formed by stacking each layer on the glass substrate 11 sequentially by using DC magnetron sputtering. For example, the sputter gas pressure is 4–6 mTorr, and temperature is room temperature.

On the glass substrate 11, and from the side where the light is emitted, an underlayer 12, the first magnetic layer (the optical head positioning layer) 13, the intermediate layer 14, the second magnetic layer (the recording layer) 15, and a protection layer 16 are formed sequentially.

As an example of the magnetic recording medium 10 shown in FIG. 1, the underlayer 12 may be formed from SiN, the first magnetic layer (the optical head positioning layer) 13 may be formed from GdFeSi, the intermediate layer 14 may be formed from Cr to magnetically decouple the optical head positioning layer 13 and the recording layer 15, the recording layer 15 may be formed from SmCo, and the protection layer 16 may be formed by stacking a Cr layer and a carbon layer in order to prevent the recording layer 15 from being oxidized.

The Curie temperature Tc1 of the optical head positioning layer 13 is about 150 degrees C. when the optical head positioning layer 13 is formed from GdFeSi, and the Curie temperature Tc2 of the recording layer 15 is about 350 degrees C. when the recording layer 15 is formed from SmCo. As for the coercivity at room temperature, the coercivity Hc1 of the optical head positioning layer 13 is about 100 Oe, and the coercivity Hc2 of the recording layer 15 is about 3.3 kOe.

As for the film thickness, from the SiN underlayer 12, for example, the SiN layer 12 is 70 nm, the GdFeSi layer 13 is 40 nm, the Cr layer 14 is 50 nm, the SmCo layer 15 is 20 nm, the Cr layer of the protection layer 16 is 5 nm, and the C layer of the protection layer 16 is 1 nm.

It is preferable to form a lubrication layer 17 by coating a lubricating agent on the carbon layer 16 in order to evaluate the recording and reproduction performance of the magnetic head 20.

The optical head positioning layer 13 may be an amorphous alloy thin film, which may include rare earth metals or transitional metals including Gd, and it is preferable to use GdFe which is a magnetic material. The Curie temperature Tc1 of the optical head positioning layer 13 can be adjusted by adding Si. Instead of Si, Cr and Al may also be added. In addition, Nd, or other rare earth metals may also be added, and a multiplayer including Co/Pt may also be used.

Here, the intermediate layer 14 is formed from Cr. In order to control the thermal diffusion of the magnetic recording medium 10, in addition to metals such as Si, Cr, Cu, Au, Ag, Al, Ti, Ta, dielectric materials such as Y—$SiO_2$, Tb—$SiO_2$, AiN, $Al_2O_3$ may also be used. The underlayer 12 may also be formed from the above dielectric materials. The intermediate layer 14 is formed to decouple the magnetic coupling between the optical head positioning layer 13 and the recording layer 15. The state, in which the magnetic coupling between the optical head positioning layer 13 and the recording layer 15 is decoupled, is necessary when positioning the optical head 30, and when recording magnetic information by the magnetic head 20. In other words, when positioning the optical head 30 and when recording magnetic information by the magnetic head 20, if the magnetic exchange coupling exists between the optical head positioning layer 13 and the recording layer 15, the magnetic head 20 has to supply a greater magnetic field, and this should be avoided. Therefore, generally, the intermediate layer 14 is formed from a non-magnetic material.

Except the above two cases, however, if the magnetic exchange coupling exists between the optical head positioning layer 13 and the recording layer 15, thermal fluctuation resistance of the recording layer 15 is improved. Therefore, the magnetic characteristic of the intermediate layer 14 is modified so that magnetic exchange coupling between the optical head positioning layer 13 and the recording layer 15 is decoupled when positioning the optical head 30 and when recording magnetic information by the magnetic head 20. In other cases, the magnetic recording medium 10 may be configured so that the magnetic exchange coupling occurs between the optical head positioning layer 13 and the recording layer 15. The magnetic recording medium 10 having such a configuration is described in the second embodiment.

The magnetic head 20 may be a merge type magnetic head combining a recording head and a reproduction head. The recording head may have a track width of 2 μm and a gap width of 0.3 μm.

The optical head 30 may have a wavelength of 670 nm, an NA of 0.55, and a linear velocity for recording and reproduction of 5 m/s.

In the present embodiment, the magnetic optical signal (Kerr rotation angle) from the optical head positioning layer 13 is utilized in order to position the optical head 30. In this case, the positioning magnetic field Hr (an alternating magnetic field) supplied from the magnetic head 20, the coercivity Hc1 of the optical head positioning layer 13, and the coercivity Hc2 of the recording layer 15 satisfy the relation:

Hc1<Hr<Hc2.

As long as this relation of the coercivity is satisfied, the magnetic information already recorded in the recording layer 15 will not be deleted when the positioning light Pr is emitted.

Summarized below are the conditions that the optical head positioning layer 13 and the recording layer 15 should satisfy as described in the above concerning the configuration of the magnetic recording medium 10.

1). Positioning the optical head while not influencing the recording layer 15.

When positioning the optical head 30, under the condition that the positioning light Pr is emitted on the optical head positioning layer 13, the positioning magnetic field Hr is supplied from the magnetic head 20. At this time, the optical head positioning layer 13, on which the positioning magnetic field Hr is applied, is magnetized, and the present magnetization state of the optical head positioning layer 13 is rotated to another magnetization state. In other words, the coercivity Hc1 of the optical head positioning layer 13 is sufficient large to rotate the magnetization state when the positioning magnetic field Hr is supplied under the condition that the positioning light Pr is emitted to the optical head positioning layer 13.

But the coercivity Hc2 of the recording layer 15 should be sufficiently high to ensure that the magnetic information already recorded in the recording layer 15 will not be deleted when the positioning light Pr is emitted. In other words, the coercivity Hc2 of the recording layer 15 should be sufficiently high to ensure the recording layer 15 to be magnetically stable when the positioning magnetic field Hr is supplied under the condition that the positioning light Pr is emitted to the optical head positioning layer 13.

Therefore, the optical head positioning layer 13 and the recording layer 15 should be configured so as to at least satisfy the relation: Hc1<Hr<Hc2.

2). Suppressing the leakage magnetic field from the optical head positioning layer 13 during recording.

For this purpose, preferably, it is set that the Curie temperature Tc1 of the optical head positioning layer 13 is lower than the Curie temperature Tc2 of the recording layer 15, and that the coercivity Hc1 of the optical head positioning layer 13 substantially disappears around the Curie temperature Tc2. That is, the optical head positioning layer 13 and the recording layer 15 should be configured so as to at least satisfy the relation: Tc1<Tc2.

3). By thermal assisting, which involves light emission, magnetic information are reliably recorded to the recording layer 15.

To do this, under the condition that the recording assisting light P is emitted to the recording layer 15, when the recording magnetic field Hw is supplied from the magnetic head 20, the following relation should be satisfied: Hc2<Hw. That is, the Curie temperature Tc2 of the recording layer 15 is set so that the coercivity Hc2 of the recording layer 15 satisfies the above relation.

Figure 3A:
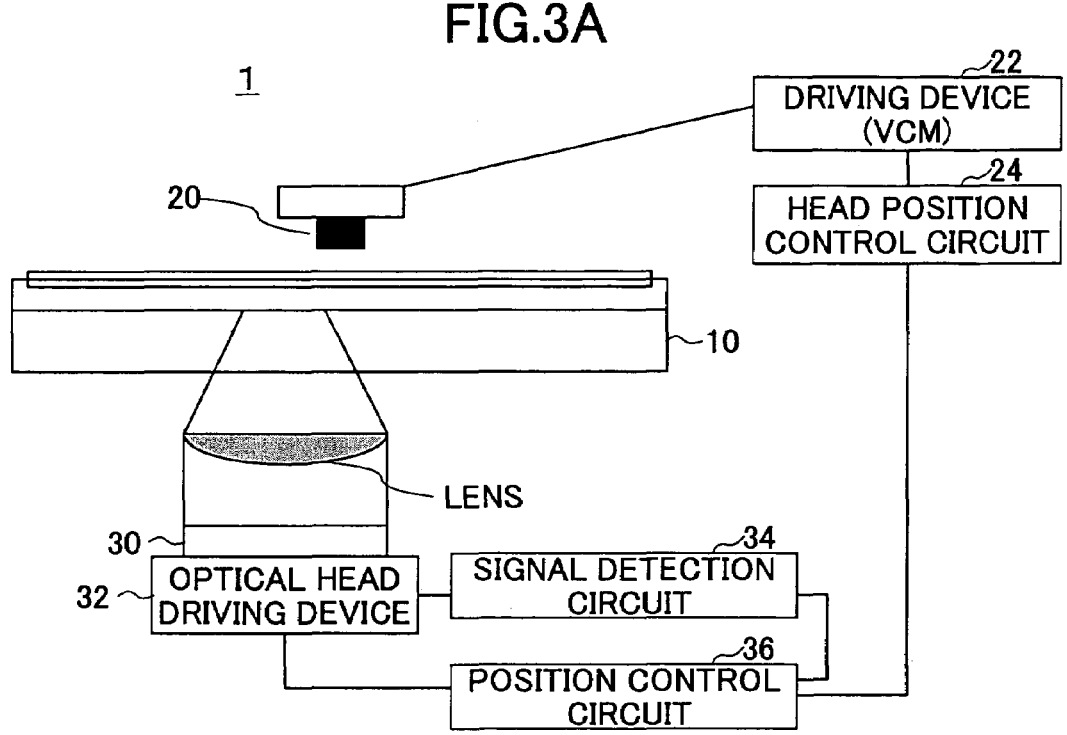
FIG. 3A is a block diagram schematically showing a configuration of a magnetic recording device of the first embodiment.
Figure 3B:
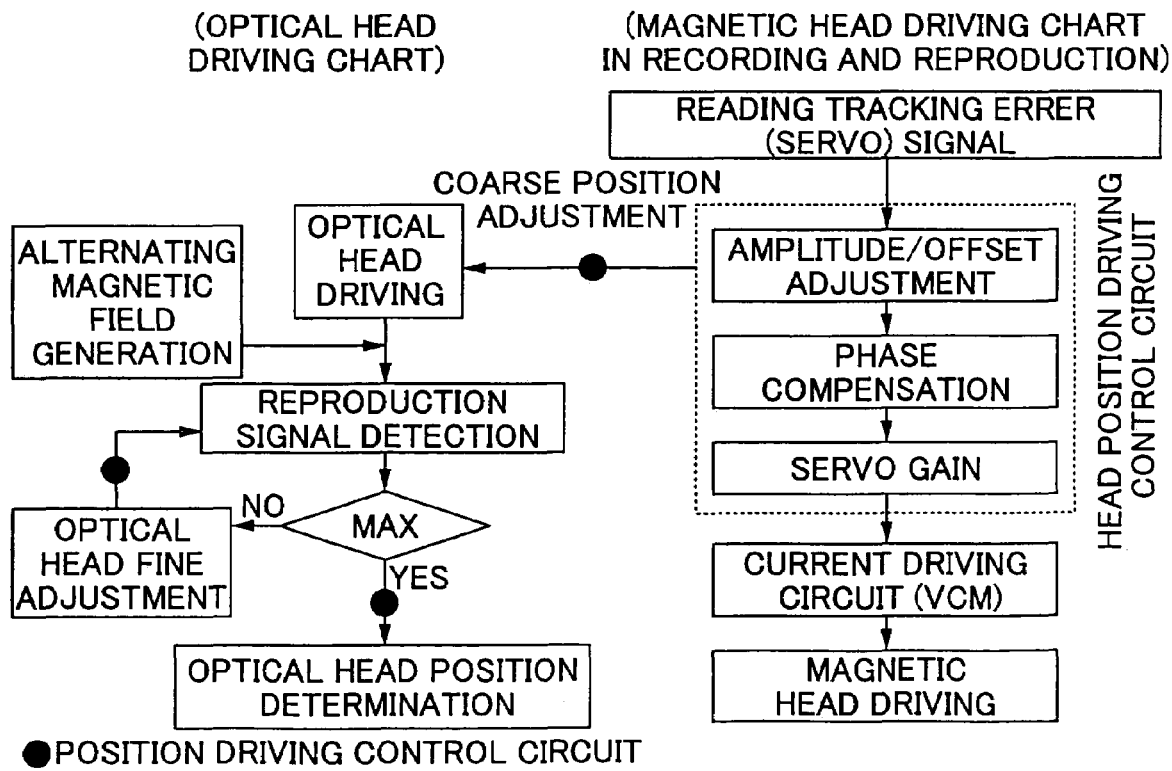
FIG. 3B is a flow chart explaining the operations of the magnetic head and the optical head.

FIG. 3A is a block diagram schematically showing a configuration of a magnetic recording device 1 of the present embodiment. FIG. 3B is a flow chart explaining the operations of the magnetic head 20 and the optical head 30. In FIG. 3A and FIG. 3B, the same numeral numbers are used for the same elements shown in FIG. 1.

In FIG. 3A and FIG. 3B, the magnetic head 20 can move to a specified position at high precision based on a servo signal (address information) recorded in the magnetic recording medium 10. The magnetic head 20 is driven by a driving device (VCM) 22 in a radial direction above the magnetic recording medium 10. The position of the magnetic head 20 is controlled by a magnetic head position control circuit 24.

The right-hand part of the flow chart in FIG. 3B shows the operation of the position control of the magnetic head 20. The magnetic head 20 is servo-controlled, and can be positioned at a specified position based on the magnetic recording medium 10 at high precision.

The magnetic recording device 1 also has a mechanism for positioning the optical head 30 at high precision to the position facing the magnetic head 20.

The optical head 30 is driven by an optical head driving device 32 in the radial direction below the magnetic recording medium 10. The position of the optical head 30 is controlled by a signal detection circuit 34, which detects signals corresponding to the position of the optical head 30 by utilizing the magnetic optical effect, and a position control circuit 36.

The position control circuit 36 also detects the position of the magnetic head 20 from the magnetic head position control circuit 24, and drives the optical head driving device 32 so that the optical head 30 is positioned at high precision at the position facing the magnetic head 20.

The driving control of the position control circuit 36 includes a coarse position control in which, after receiving signals from the magnetic head position control circuit 24, the optical head 30 is moved near the position facing the magnetic head 20, and a feedback control by which using the signals from the signal detection circuit 34, the optical head 30 is moved to the position facing the magnetic head 20 at high precision. The left-hand part of the flow chart in FIG. 3B shows the operation of the position control of the optical head 30.

Next, the tracking operation when positioning the optical head 30 is explained. When the magnetic head 20 is moved in a predetermined way, the position control signal from the magnetic head position control circuit 24 is input to the position control circuit 36. The position control circuit 36 first performs a coarse position tracking to move the optical head 30 to a position near the track where the magnetic head 20 is located.

Next, the positioning magnetic field Hr is supplied from the magnetic head 20 to the optical head 30 in order to optimize the position of the optical head 30. At this time, the positioning light Pr emitted from the optical head 30, the positioning magnetic field Hr, and the coercivity Hc1 of the optical head positioning layer 13 satisfy the aforementioned relation.

With the configuration of the magnetic recording medium 10 shown in the present embodiment, because there is no magnetic exchange coupling between the optical head positioning layer 13 and the recording layer 15, when the positioning magnetic field Hr is applied, the magnetization of the optical head positioning layer 13 is reversed to the same direction.

If magnetic exchange coupling occurs between the optical head positioning layer 13 and the recording layer 15, and the magnetization of the optical head positioning layer 13 is bound by the magnetization of the recording layer 15, the coercivity Hc to bind the optical head positioning layer 13 and the recording layer 15 increases, and good signals cannot be detected.

Figure 4:
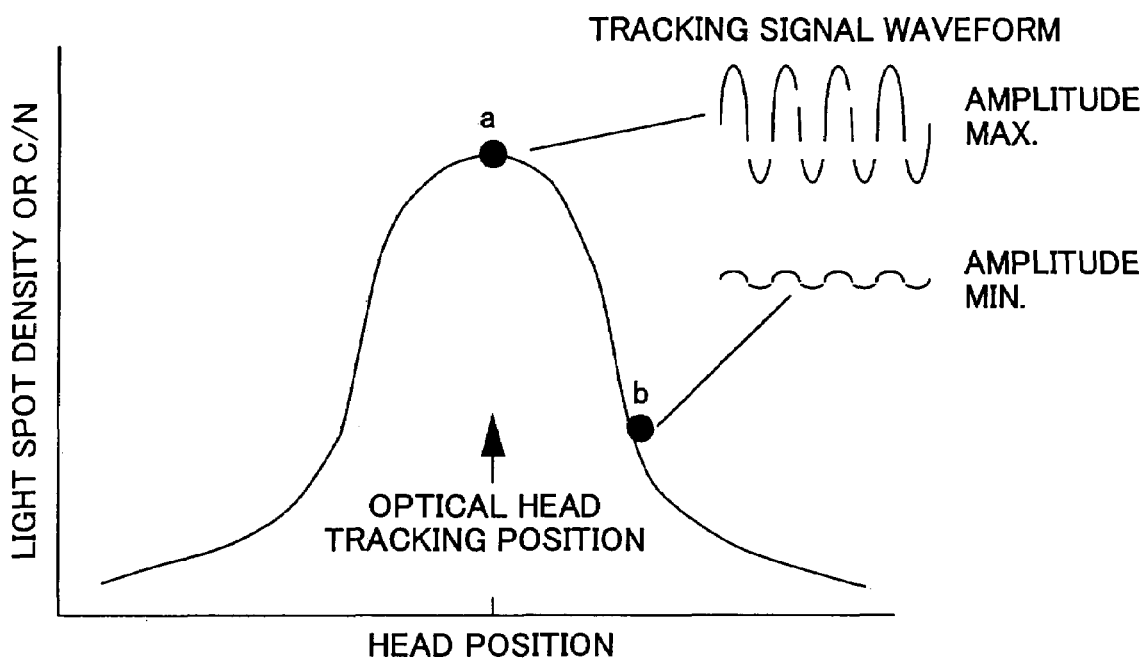
FIG. 4 is a graph schematically showing a tracking signal (detected signal) obtained in tracking by the magnetic recording device of the first embodiment.

FIG. 4 is a graph schematically showing a tracking signal (detected signal) obtained in tracking by the magnetic recording device 1.

The optical head 30 is shifted relative to the track position of the magnetic head 20, the positioning magnetic field Hr decreases, and the magnetization inversion region in the optical head positioning layer 13 decreases. Because of the degrading of the carrier signal, this also leads to degrading of the C/N value. On the other hand, at the optimum position (precisely determined position facing the magnetic head), because the strength of the magnetic field or the light density becomes maximum, the C/N value becomes a maximum (referring to FIG. 5).

In order to optimize the position of the optical head 30, preferably, the alternating magnetic field frequency of the positioning magnetic field Hr from the magnetic head 20 is set to different values in order to avoid confusion with the signals for recording magnetic information and reproducing magnetic information by the magnetic head 20. That is, the positioning alternating magnetic field frequency may be any value, but it is preferable to set this frequency different from those of signals for recording magnetic information and reproducing magnetic information, and higher order frequencies thereof.

With the above configuration, even for the magnetic recording medium not having smooth grooves, it is possible to precisely position the optical head 30 to the position facing the magnetic head 20.

The magnetic recording device 1 was tested to confirm whether the tracking signals could be obtained from the optical head positioning layer 13 formed from GdFeSi in response to the positioning magnetic field Hr from the magnetic head 20. In this test, a signal having a frequency of 5 MHz was input to the recording head of the magnetic head 20, and the head current was set so that the positioning magnetic field Hr was 400 Oe. The positioning light Pr was 1 mW.

Figure 5:
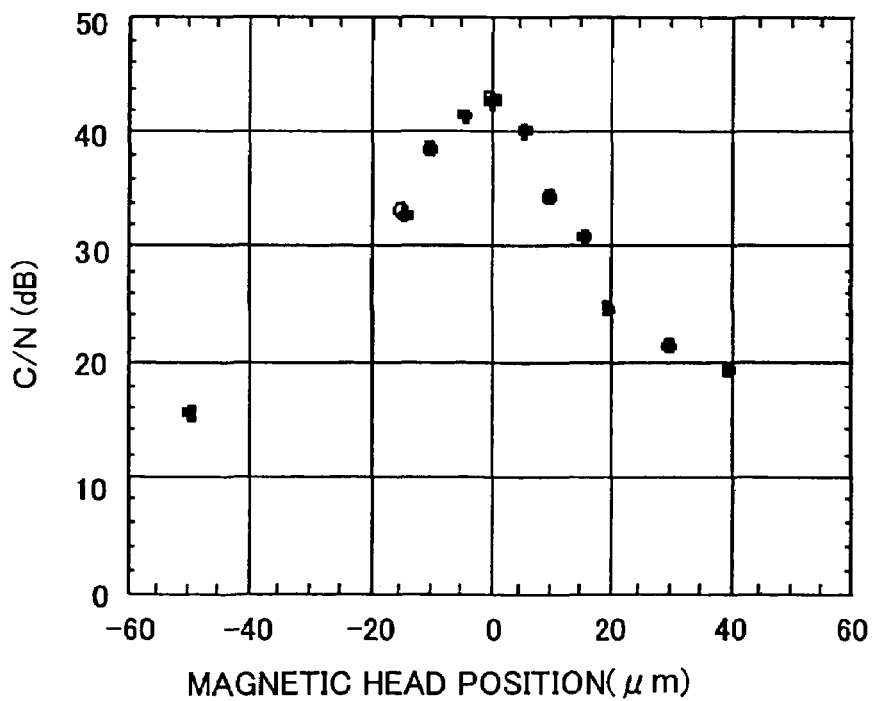
FIG. 5 shows measurement results of variation of C/N of the tracking signal obtained when changing the position of the magnetic head with the position of the optical head being fixed.

FIG. 5 shows the thus obtained variation of C/N of the tracking signal obtained when changing the position of the magnetic head 20 with the position of the optical head 30 being fixed. Therefore, it is revealed that the same C/N characteristic as that shown in FIG. 4 was obtained, indicating that the optical head 30 was at the optimum position, that is, the position facing the magnetic head 20.

In addition, experiments in recording magnetic information on the magnetic recording medium 10 were performed with the recording mark length to be fixed with the positioning light Pr being emitted and not being emitted. In these experiments, the signal (tracking signal) for positioning the optical head 30 having a different frequency, and the recording signal were transmitted to the recording head of the magnetic head 20 alternately at equal intervals.

As a result, when the positioning light Pr was emitted from the optical head 30 to perform tracking, and the recording assisting light Pw was emitted during recording, the S/N was improved by 5 bB compared with the case in which the positioning light Pr was not used, indicating the effectiveness of the present invention.

In order to precisely track the optical head 30, it is preferable to focus the light spot more For doing this, a laser having a shorter wave length or increased NA may be used in the optical head 30.

It is described above that the optical head positioning layer 13 may be an amorphous alloy thin film formed from rare earth metals or transitional metals including Gd, but it is also possible to use a Co/Pt multi-layer film, or a film with added rare earth metals such as Nd having a large magnetic optical effect in the short wavelength region, therefore enabling usage of short wavelengths.

Second Embodiment

Below, the second embodiment of the present invention is explained. In the second embodiment, the magnetic recording medium used in the magnetic recording device is different from that in the first embodiment.

Figure 6:
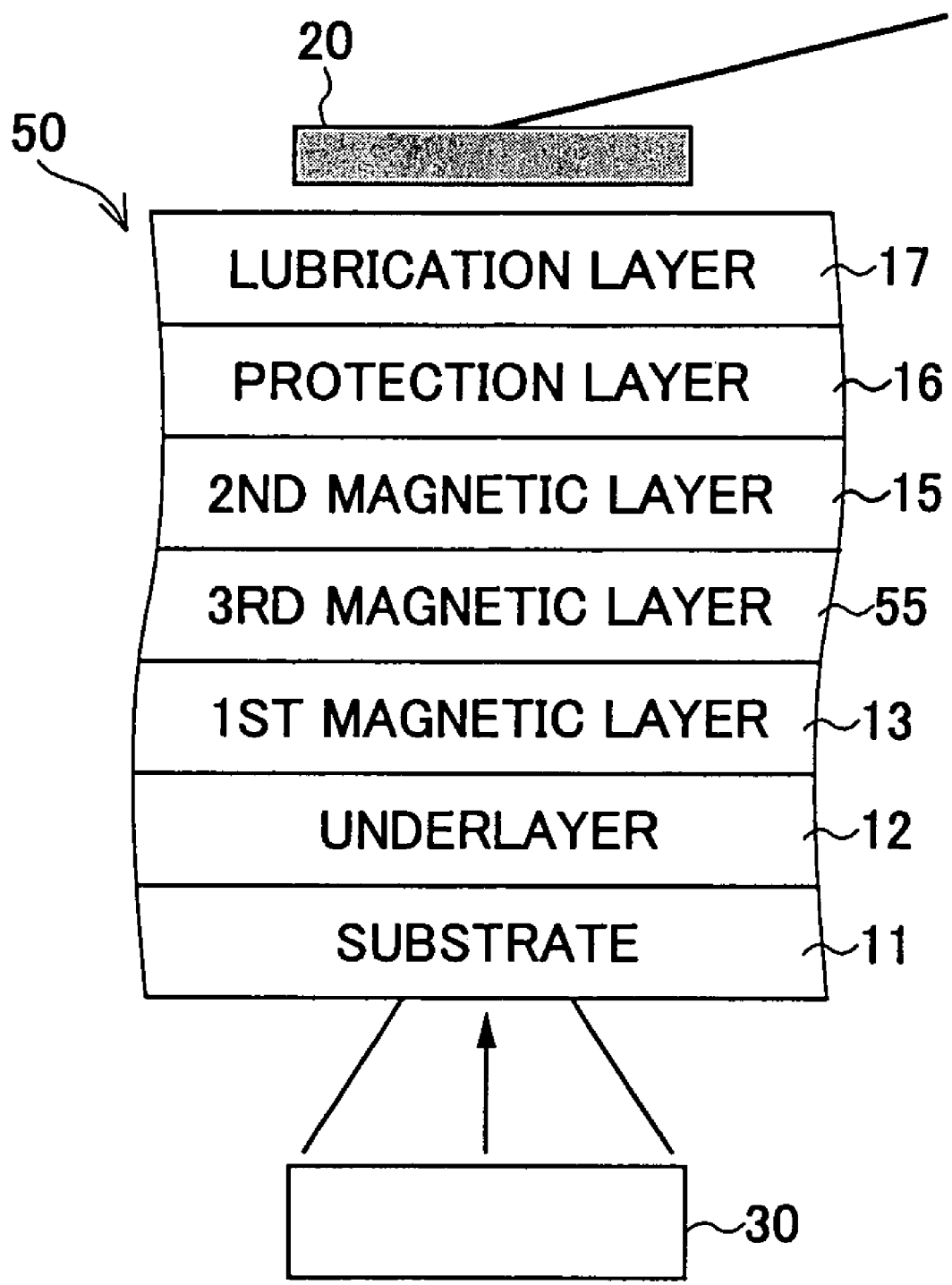
FIG. 6 is an enlarged view of a schematic configuration of a magnetic recording medium of the second embodiment of the present invention and devices around the magnetic recording medium.

FIG. 6 is a schematic enlarged view of the structure of the magnetic recording medium 50 of the second embodiment of the present invention and devices around the magnetic recording medium 50.

The basic configuration of the magnetic recording device of the second embodiment is the same as that of the first embodiment, and the same numeral references are used for the same elements as those in FIG. 1, and the overlapping explanations are omitted.

In the magnetic recording medium 10 shown in FIG. 1, in order that magnetic exchange coupling does not occur between the optical head positioning layer 13 and the recording layer 15, a non-magnetic intermediate layer 14 is interposed between the two layers.

As described above, except for the cases when positioning the optical head 30 and when recording magnetic information by the magnetic head 20, however, if the magnetic coupling exists between the optical head positioning layer 13 and the recording layer 15, the thermal fluctuation resistance of the recording layer 15 is improved.

Therefore, in the magnetic recording medium 50 of the present embodiment, a third magnetic layer 55 is used to replace the non-magnetic intermediate layer 14 in the first embodiment.

If the coercivity of the third magnetic layer 55 is Hc3, the Curie temperature is Tc3, the temperature of the magnetic recording medium 50 is t when the positioning magnetic field Hr is supplied from the magnetic head 20 under the condition that the positioning light Pr is being emitted to the optical head positioning layer 13, the third magnetic layer 55 is configured so that the relation Tc3<t<Tc1 is satisfied. By such a configuration, the coercivity Hc3 of the third magnetic layer 55 substantially disappears when positioning the optical head 30. Thus, when positioning the optical head 30, the magnetic recording medium 50 reaches the same state as that of the magnetic recording medium 10.

In the magnetic recording medium 50, the same as the magnetic recording medium 10, the relation Tc1<Tc2 should be satisfied. Hence, if the aforementioned relation Tc3<t<Tc1 is satisfied, the coercivity Hc3 of the third magnetic layer 55 completely disappears when recording magnetic information to the recording layer 15 when the recording magnetic field Hw is supplied under the condition that the recording assisting light Pw is being emitted.

The magnetic recording medium 50 of the present embodiment has the advantage that the magnetic state recorded in the recording layer 15 is transferred to the optical head positioning layer 13 by the exchange coupling. Consequently, the recording layer becomes thicker. Because of this, new effects can be achieved, such as, (1) the reproduction signal represented by tBr increases, where t is the thickness of the magnetic layer, Br is the residual magnetization, and (2) the thermal fluctuation resistance is improved.

With reference to FIG. 6, specific layers of the magnetic recording medium 50 are explained. The underlayer 12 may be formed from SiN, the first magnetic layer (the optical head positioning layer) 13 may be formed from GdFeSi, the third magnetic layer 55 may be formed from DyFeCo, the second magnetic layer (recording layer) 15 may be formed from TbFeCo, and the protection layer 16 may be formed by stacking a Cr layer and a carbon layer in order to prevent the recording layer 15 from being oxidized.

The Curie temperatures of the optical head positioning layer 13 formed from GdFeSi, the third magnetic layer 55 formed from DyFeCo, and the recording layer 15 formed from TbFeCo, are about 180 degrees C., 120 degrees C., and 300 degrees C., respectively. As for the coercivity at room temperature, the coercivity of the optical head positioning layer 13 is about 200 Oe, the coercivity of the third magnetic layer 55 is about 100 Oe, and the coercivity of the recording layer 15 is about 3 kOe. As for the film thickness, from the SiN underlayer 12, the SiN layer 12 is 70 nm, the GdFeSi layer 13 is 40 nm, the DyFeCo layer 55 is 40 nm, the TbFeCo layer 15 is 40 nm, the Cr layer of the protection layer 16 is 5 nm, and the C. layer of the protection layer 16 is 1 nm.

The magnetic recording median 50 was tested with the positioning light Pr to be 1.5 mW. The same results as shown in FIG. 5 were obtained, hence, it was revealed that with the magnetic recording medium 50, it is also possible to set the optical head 30 to the position facing the magnetic head 20, just as is done with the magnetic recording medium 10.

According to the present embodiment, it is possible to precisely set the optical head 30 to an optimum position facing the magnetic head 20. Therefore, when recording magnetic information in the recording layer 15 with the magnetic head 20, the effect of the thermal assist technique can be employed reliably. As a result, it is possible to provide a magnetic recording device capable of magnetic information recording at higher recording density.

By changing the intermediate layer from a non-magnetic layer to a magnetic layer satisfying certain conditions, and allowing occurrence of the magnetic exchange coupling between the optical head positioning layer 13 and the recording layer 15, it is possible to provide a magnetic recording medium having improved thermal fluctuation resistance.

The optical head positioning layer 13 is formed so as to have a magnetic anisotropy at least in a direction perpendicular to the surface of the optical head positioning layer 13 when positioning the optical head 30, and therefore, it is possible to improve the sensitivity of detecting the magnetic optical effect.

In the present embodiment, by changing the alternating frequencies for generating the corresponding magnetic fields, the magnetic head 20 is able to alternately supply the positioning magnetic field Hr and the recording magnetic field Hw. But a magnetic head may be provided separately to supply the positioning magnetic field Hr. In this case, if the optical head for emitting the recording assisting light Pw is also provided separately from the positioning head, it is possible to realize a configuration capable of recording magnetic information in the recording layer 15 while performing positioning of the optical head 30.

While the invention has been described with reference to preferred embodiments, the invention is not limited to these embodiments, but numerous modifications could be made thereto without departing from the basic concept and scope described in the claims.

As described clearly in the above, according to the present invention, concerning methods of recording magnetic information on a magnetic recording medium by employing a thermal assist technique, it is possible to precisely position an optical head relative to a magnetic head. Therefore, it is possible to record magnetic information on the magnetic recording medium at high density and reproduce the magnetic information, thus enabling higher recording density.

The invention claimed is:

1. A magnetic recording medium, comprising:
    a recording magnetic layer able to be recorded with magnetic information;
    a positioning magnetic layer used for positioning an optical head to a predetermined position relative to a magnetic head, the magnetic head applying a magnetic field to the recording magnetic layer and said optical head emitting a laser beam to the recording magnetic layer when positioning the optical head to the predetermined position and when recording the magnetic information in the recording; and
    an intermediate layer between the recording magnetic layer and the positioning magnetic layer for decoupling magnetic coupling between the recording magnetic layer and the positioning magnetic layer when positioning the optical head to the predetermined position and when recording the magnetic information in the recording magnetic layer.

2. The magnetic recording medium according to claim 1, wherein a Curie temperature $Tc1$ of the positioning magnetic layer and a Curie temperature $Tc2$ of the recording layer satisfy: $Tc1<Tc2$.

3. The magnetic recording medium according to claim 2, wherein
    a coercivity $Hc1$ of the positioning magnetic layer and a coercivity $Hc2$ of the recording magnetic layer are set to satisfy $Hc1<Hc2$, and the coercivity $Hc1$ substantially disappear at a temperature equal to or higher than a temperature near the Curie temperature $Tc2$ of the recording layer.

4. The magnetic recording medium according to claim 1, wherein the intermediate layer is a non-magnetic layer for decoupling magnetic exchange coupling between the recording magnetic layer and the positioning magnetic layer.

5. The magnetic recording medium according to claim 1, wherein the intermediate layer has a coercivity $Hc3$ less than a coercivity $Hc1$ of the positioning magnetic layer, and is set so that magnetization of the positioning magnetic layer substantially disappears at a temperature equal to or higher than a temperature near a Curie temperature $Tc1$ of the positioning magnetic layer.

6. The magnetic recording medium according to claim 1, wherein a coercivity $Hc1$ of the positioning magnetic layer and a coercivity $Hc2$ of the recording magnetic layer are set to satisfy the relation:

$$Hc1<Hr<Hc2,$$

where Hr is the positioning magnetic field supplied when positioning the optical head.

7. The magnetic recording medium according to any one of claim 1 through 6, wherein the positioning magnetic layer has a magnetic anisotropy at least in a direction perpendicular to a surface thereof when positioning the optical head.

8. A magnetic recording medium, comprising:
    a recording magnetic layer able to be recorded with magnetic information;
    a positioning magnetic layer used for positioning an optical head to a predetermined position relative to a magnetic head, the magnetic head applying a magnetic field to the recording magnetic layer and said optical head emitting a laser beam to the recording magnetic layer when positioning the optical head to the predetermined position and when recording the magnetic information in the recording magnetic layer; and a third magnetic layer between the recording magnetic layer and the positioning magnetic layer, a coercivity Hc3 of the third magnetic layer substantially disappearing when the optical head emits the laser beam to the recording magnetic layer to position the optical head to the predetermined position or to record the magnetic information in the recording magnetic layer.

* * * * *